(12) United States Patent
Tharp et al.

(10) Patent No.: US 7,624,889 B2
(45) Date of Patent: Dec. 1, 2009

(54) LOCKING CAP

(75) Inventors: Robert Daniel Tharp, Sussex, WI (US); Michael Joseph Holz, West Bend, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 376 days.

(21) Appl. No.: 11/624,708

(22) Filed: Jan. 19, 2007

(65) Prior Publication Data
US 2007/0169524 A1 Jul. 26, 2007

Related U.S. Application Data

(60) Provisional application No. 60/760,670, filed on Jan. 20, 2006, provisional application No. 60/760,613, filed on Jan. 20, 2006, provisional application No. 60/760,674, filed on Jan. 20, 2006, provisional application No. 60/862,077, filed on Oct. 19, 2006, provisional application No. 60/862,074, filed on Oct. 19, 2006.

(51) Int. Cl.
*B65D 41/04* (2006.01)
*B65D 55/14* (2006.01)
*B65B 3/00* (2006.01)

(52) U.S. Cl. ............ 220/288; 220/210; 220/86.1; 220/86.2; 70/165; 70/167; 70/172

(58) Field of Classification Search .......... 220/288, 220/210, 86.1, 86.2, DIG. 33; 215/207, 220; 70/165, 167, 172
See application file for complete search history.

(56) References Cited

U.S. PATENT DOCUMENTS

| 738,917 | A | 9/1903 | Kempien |
| 1,694,030 | A | 12/1928 | Bean |
| 1,702,205 | A | 2/1929 | Freedman |
| 1,702,532 | A | 2/1929 | Boomer et al. |
| 2,070,692 | A | 2/1937 | Stone |
| 2,308,892 | A | 1/1943 | Miller |

(Continued)

FOREIGN PATENT DOCUMENTS

DE 4006465 9/1991

(Continued)

*Primary Examiner*—Anthony D Stashick
*Assistant Examiner*—Andrew T Kirsch
(74) *Attorney, Agent, or Firm*—Michael Best & Friedrich LLP

(57) ABSTRACT

A cap for selective attachment with a threaded opening includes an outer cover and an inner portion, the inner portion lying at least partially within the outer cover and having threads engageable with the threaded opening and a set of circumferentially-spaced teeth arranged to selectively receive torque from manual rotation of the outer cover. A slider in constant driving engagement with the outer cover is selectively engageable with the teeth of the inner portion to transmit torque from the outer cover to the inner portion. An actuator is provided to actuate the slider into and out of engagement with the teeth of the inner portion. A lock is provided accessible from outside the outer cover and being coupled to the actuator. A locked state of the cap is one in which the slider is removed from engagement with the teeth of the inner portion by the lock and actuator and an unlocked state of the cap is one in which the slider is engaged with the teeth of the inner portion.

20 Claims, 9 Drawing Sheets

U.S. PATENT DOCUMENTS

| | | |
|---|---|---|
| 2,681,559 A | 6/1954 | Friend |
| 2,696,100 A | 12/1954 | Nehls |
| 2,816,433 A | 12/1957 | Friend |
| 2,820,565 A | 1/1958 | Oberle |
| 3,136,148 A | 6/1964 | Nehls |
| 3,343,697 A | 9/1967 | Roberts et al. |
| 3,373,894 A | 3/1968 | Johnson |
| 3,426,932 A | 2/1969 | Rouse |
| 3,918,602 A | 11/1975 | McIntosh |
| 3,945,454 A | 3/1976 | Kinoshita et al. |
| 3,950,973 A | 4/1976 | Grasnianski |
| 3,998,078 A | 12/1976 | Detwiler |
| 4,000,632 A | 1/1977 | Summan |
| 4,000,633 A | 1/1977 | Evans |
| 4,013,191 A | 3/1977 | Gerdes |
| 4,083,209 A | 4/1978 | Sloan, Jr. |
| 4,107,960 A | 8/1978 | Neiman |
| 4,107,961 A | 8/1978 | Evans |
| 4,132,091 A | 1/1979 | Aro et al. |
| 4,164,302 A | 8/1979 | Gerdes |
| 4,223,799 A | 9/1980 | Eyster et al. |
| 4,231,240 A | 11/1980 | Fujita et al. |
| 4,245,751 A | 1/1981 | Neiman |
| 4,280,346 A | 7/1981 | Evans |
| 4,280,347 A | 7/1981 | Evans |
| 4,294,376 A | 10/1981 | Keller |
| 4,299,102 A | 11/1981 | Aro |
| 4,342,208 A | 8/1982 | Evans |
| 4,376,492 A | 3/1983 | Bartel et al. |
| 4,453,388 A | 6/1984 | Baker et al. |
| 4,468,058 A | 8/1984 | Haagen et al. |
| 4,485,647 A | 12/1984 | Matthews |
| 4,527,406 A | 7/1985 | Baker |
| 4,579,244 A | 4/1986 | Fukuta |
| 4,592,218 A | 6/1986 | Chechovsky et al. |
| 4,676,390 A | 6/1987 | Harris |
| 4,690,292 A | 9/1987 | Henning |
| 4,706,841 A | 11/1987 | Grajek |
| 4,754,627 A | 7/1988 | Butler, III |
| 4,765,505 A | 8/1988 | Harris |
| 4,775,061 A | 10/1988 | Coote |
| 4,779,755 A | 10/1988 | Harris |
| 4,809,869 A | 3/1989 | Cosgrove et al. |
| 4,830,058 A | 5/1989 | Harris |
| 4,830,213 A | 5/1989 | Sleder |
| 4,881,597 A | 11/1989 | Hensley |
| 4,887,733 A | 12/1989 | Harris |
| 4,892,216 A | 1/1990 | Scott |
| 4,978,027 A | 12/1990 | Larson |
| 4,984,698 A | 1/1991 | Stuckey |
| 5,000,339 A | 3/1991 | Wheat et al. |
| 5,042,678 A | 8/1991 | Munguia |
| 5,108,001 A | 4/1992 | Harris |
| 5,110,003 A * | 5/1992 | MacWilliams .............. 220/304 |
| 5,167,340 A | 12/1992 | Shaw |
| 5,171,439 A | 12/1992 | Vakharia |
| 5,183,173 A | 2/1993 | Heckman |
| 5,212,971 A | 5/1993 | Yoon et al. |
| 5,381,919 A | 1/1995 | Griffin et al. |
| 5,449,086 A | 9/1995 | Harris |
| 5,467,621 A | 11/1995 | Gravino |
| 5,520,300 A * | 5/1996 | Griffin ........................ 220/210 |
| 5,540,347 A | 7/1996 | Griffin |
| 5,638,975 A | 6/1997 | Harris |
| 5,732,841 A | 3/1998 | Jocic et al. |
| 5,791,507 A | 8/1998 | Harris et al. |
| 5,794,806 A | 8/1998 | Harris et al. |
| 5,904,057 A | 5/1999 | Abney, III et al. |
| 5,924,590 A | 7/1999 | Jocic et al. |
| 5,985,002 A | 11/1999 | Grantham |
| 5,992,669 A | 11/1999 | Hagano et al. |
| 5,992,672 A | 11/1999 | Hagano et al. |
| 6,056,140 A | 5/2000 | Muth et al. |
| 6,095,363 A | 8/2000 | Harris et al. |
| 6,109,467 A | 8/2000 | Schniemann |
| RE036,959 E | 11/2000 | Griffin |
| 6,193,093 B1 | 2/2001 | Brunner |
| 6,202,879 B1 | 3/2001 | Gericke |
| 6,202,901 B1 | 3/2001 | Gerber et al. |
| 6,220,064 B1 | 4/2001 | Oddenino |
| 6,230,918 B1 | 5/2001 | Huynh et al. |
| 6,231,106 B1 | 5/2001 | Nagasaka |
| 6,293,996 B1 | 9/2001 | Grantham et al. |
| RE37,776 E | 7/2002 | Foltz |
| 6,415,941 B1 | 7/2002 | Huse |
| 6,478,360 B1 | 11/2002 | Reutter |
| 6,562,110 B2 | 5/2003 | Koros et al. |
| 6,579,342 B2 | 6/2003 | Wang et al. |
| 6,585,802 B2 | 7/2003 | Koros et al. |
| 6,626,157 B2 | 9/2003 | Perry |
| 6,651,707 B2 | 11/2003 | Zimmer et al. |
| 6,685,045 B1 | 2/2004 | Palvolgyi |
| 6,688,146 B2 | 2/2004 | Michels et al. |
| 6,701,952 B1 | 3/2004 | Ehrman et al. |
| 6,705,267 B1 | 3/2004 | Westerbeke, Jr. et al. |
| 6,779,544 B2 | 8/2004 | Devall |
| 6,782,911 B2 | 8/2004 | DeCapua et al. |
| 6,796,451 B2 | 9/2004 | Harris |
| 6,895,943 B1 | 5/2005 | Taxon |
| 6,935,527 B1 | 8/2005 | Brock |
| 6,942,124 B2 | 9/2005 | Dehn et al. |
| 6,953,496 B2 | 10/2005 | Grantham et al. |
| 6,981,532 B2 | 1/2006 | Dehn et al. |
| 2001/0052292 A1 | 12/2001 | Ito |
| 2003/0209574 A1 | 11/2003 | Lin et al. |
| 2005/0098160 A1 | 5/2005 | Taxon |

FOREIGN PATENT DOCUMENTS

| | | |
|---|---|---|
| DE | 9205925 | 12/1992 |
| EP | 0461852 | 12/1991 |
| EP | 1574381 | 9/2005 |
| FR | 1357064 | 4/1964 |
| GB | 1487489 | 9/1977 |
| WO | 9015662 | 12/1990 |
| WO | 9503949 | 2/1995 |
| WO | 0020292 | 4/2000 |

\* cited by examiner

LOCKING CAP

RELATED APPLICATIONS

The present application claims priority to U.S. Patent Application Ser. No. 60/760,670, filed Jan. 20, 2006, entitled VENT INCLUDING A SEPARATOR MEMBRANE, and to U.S. Patent Application Ser. No. 60/760,613, filed Jan. 20, 2006, entitled MODULAR RATCHET CAP, and to U.S. Patent Application Ser. No. 60/760,674, filed Jan. 20, 2006, entitled LOCKING CAP, and to U.S. Patent Application Ser. No. 60/862,077, filed Oct. 19, 2006, entitled LOCKING CAP, and to U.S. Patent Application Ser. No. 60/862,074, filed Oct. 19, 2006, entitled VENT INCLUDING A SEPARATOR MEMBRANE, and to U.S. patent application Ser. No. 11/624,711, filed Jan. 19, 2007, entitled VENT INCLUDING A SEPARATOR MEMBRANE, and to U.S. patent application Ser. No. 11/624,709, filed Jan. 19, 2007, entitled MODULAR RATCHET CAP, the entire contents of all of which are hereby incorporated by reference.

FIELD OF THE INVENTION

The present invention relates to caps and, more particularly, to a locking cap, especially for use on a tank such as, for example, a fuel tank.

SUMMARY OF THE INVENTION

In independent aspects and in some constructions, the invention provides a cap for closing an opening, such as the filling tube on a fuel tank, the cap being operable between a locked condition, in which the cap is inhibited from being removed from the opening, and an unlocked condition, in which the cap is removable from the opening. The cap generally includes a threaded portion for engaging complementary threads on a structure of the opening, a cover portion for engagement by an operator, and a locking mechanism operable between a locked condition, to thereby inhibit the cap from being removed from the opening, and an unlocked condition, to allow the cap to be removable from the opening.

Independent features and independent advantages of the present invention will become apparent to those skilled in the art upon review of the detailed description and drawings.

Figure 1:
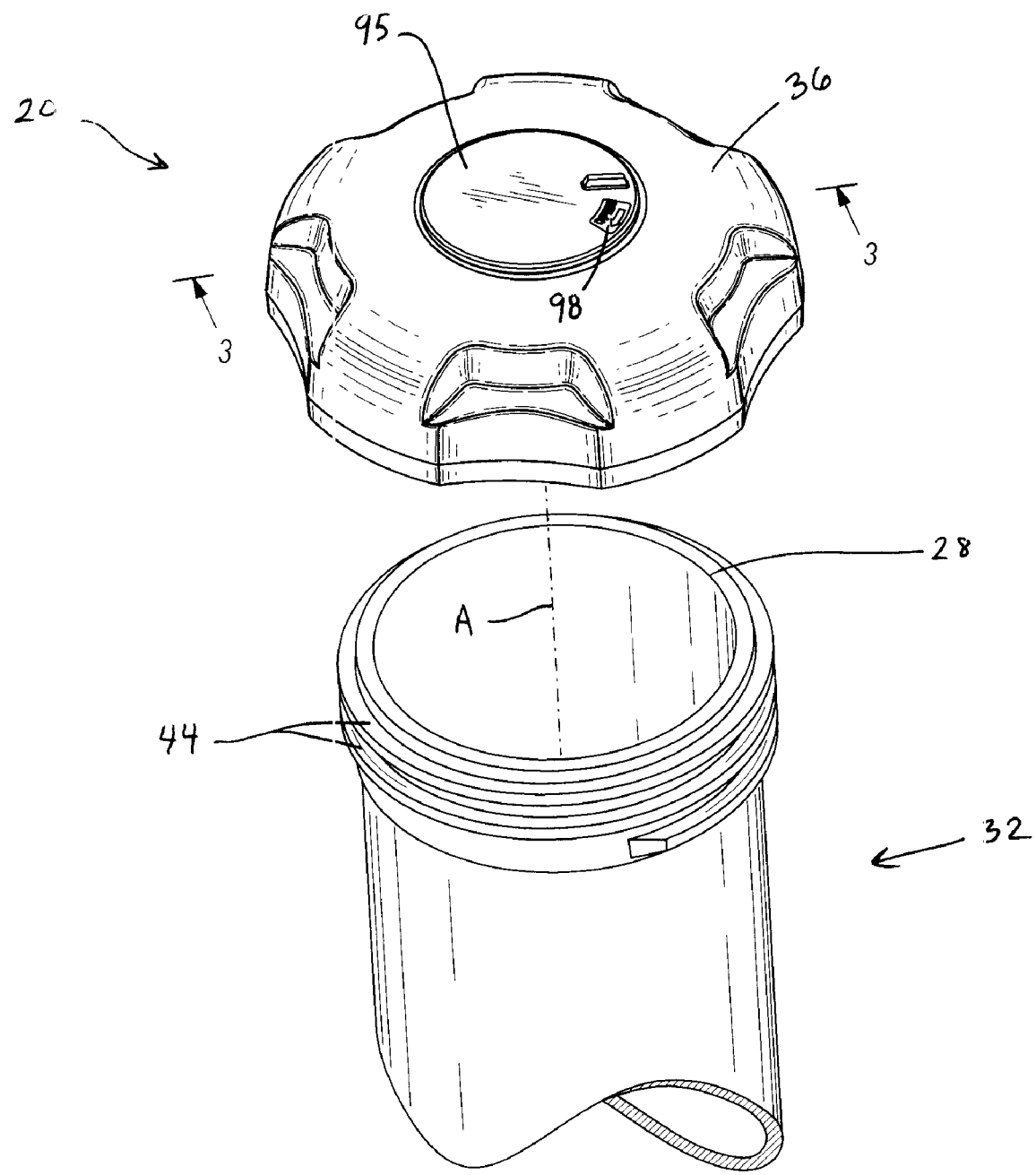
FIG. 1 is a perspective view of a locking cap according to a first embodiment.

Before any independent features and at least one embodiment of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

Although references are made below to directions, such as left, right, up, down, top, bottom, front, rear, forward, back, etc., in describing the drawings, the references are made relative to the drawings (as normally viewed) for convenience. These directions are not intended to be taken literally or to limit the present invention in any form.

The use of "including", "having", and "comprising" variations thereof herein is meant to encompass the items listed thereafter and equivalents thereof as well as additional items. The use of letters to identify elements of a method or process is simple for identification and is not meant to indicate that the elements should be performed in a particular order.

DETAILED DESCRIPTION

A cap 20 is provided with a locking mechanism 24 for selectively putting the cap 20 into a locked condition, in which the cap 20 is inhibited from being removed from an opening 28, and an unlocked condition, in which the cap 20 is removable from the opening 28. In one embodiment, the cap 20 is used to close the opening 28, which is part of a filling tube 32 of a fuel tank (not shown). In the locked condition, the cap 20 is less susceptible to vandalism, including theft of the cap 20 and/or the contents of the tank.

As shown in FIGS. 1-3 and 7, the cap 20 includes an outer cover portion 36 (or simply, "cover") engageable by an operator to rotate the cap 20 relative to the opening 28 about an axis A. The cap 20 also includes an inner threaded portion 40. The inner threaded portion 40 is a body or member formed with threads 41, which are engageable with complementary threads 44 formed on the opening 28. A seal 48 is disposed between the cover 36 and the inner threaded portion 40, and a gasket 52 is provided underneath the inner threaded portion 40 for engagement necessarily air-tight.

The cover 36 and inner threaded portion 40 are selectively engaged with each other via the locking mechanism 24. In general, the locking mechanism 24 is operable to selectively put the cap 20 in a condition that prevents its removal from the opening 28. The locking mechanism 24 selectively disengages a rotational driving connection between the cover 36 and the inner threaded portion 40 such that torque on the cover 36 about the axis A is not transferred to the inner threaded portion 40, and rotation of the cover 36 does not cause rotation of the inner threaded portion 40. In the unlocked condition, the locking mechanism 24 couples the cover 36 and the inner threaded portion 40 for transmission of torque to allow the cap 20 to be removed modifications to the tank or opening 28 and is compatible with various cap and thread sizes, including standardized cap and thread sizes.

The locking mechanism 24 includes a lock cylinder assembly 56 (in some constructions, an off-the-shelf lock cylinder) that is received in an opening 58 in the cover 36 and positioned by a retainer clip 59. The lock cylinder assembly 56 includes a cam portion 60 which is movable relative to the cover 36 and relative to the remainder of the lock cylinder assembly 56 between a first position (see FIG. 4) and a second position (see FIG. 5). In the illustrated embodiment, the cam portion 60 is rotatable about the axis A. A key (not shown) is insertable into the lock cylinder assembly 56 and operable to pivot the cam portion 60 between the first and second positions. The lock mechanism 24 also includes a slider 64 coupled to the cover 36. The slider 64 is supported on the cover 36 for rotation with the cover 36 about axis A and for selective sliding movement relative to the cover 36. In the illustrated embodiment, the slider 64 is supported for sliding in a radial direction on the cover 36, substantially perpendicular to the axis A.

The slider 64 is formed with first and second guide protrusions 64A, which extend from the slider 64 toward a transverse wall 65 of the cover 36. The transverse wall 65 is formed with a pair of guide slots 65A, which receive the guide protrusions 64A and allow movement of the slider 64 only along a short path in a direction substantially perpendicular to the axis A with respect to the cover 36. The slider 64 is also formed with a cam follower surface 66, which is contacted by the cam portion 60 to move the slider 64 along the short path as discussed in further detail below.

The locking mechanism 24 also includes structure, such as a retainer 68, supported for rotation with the inner threaded portion 40. For example, the retainer 68 is welded, bonded, or snapped into engagement with the inner threaded portion 40. In some embodiments, the retainer 68 is formed as a separate component from the inner threaded portion 40, and is thereafter permanently joined (e.g., by spin welding) with the inner threaded portion 40 such that the retainer 68 may be considered part of the inner threaded portion 40. The slider 64 and the retainer 68 include respective sets of teeth 72 and 76, which are selectively engageable with each other to connect the slider 64 to the retainer 68 and thereby connect the cover 36 to the inner threaded portion 40.

In the unlocked condition (see FIG. 4), the cam portion 60 of the lock cylinder assembly 56 is moved to the first position, forcing the slider 64 to an extended position and into engagement with the retainer 68 such that one or more slider teeth 72 are engaged with one or more retainer teeth 76. Due to the slider 64 and the retainer 68 being engaged and thus, fixed against relative rotation, an operator may grasp the cover 36 and rotate it (e.g., in a counterclockwise manner) to unscrew and remove the cap 20 from the filling tube 32. Also, an operator may grasp the cover 36 and rotate it (e.g., in a clockwise manner) to screw-on and install the cap 20 on the filling tube 32.

In the locked condition (see FIG. 5), the cam portion 60 of the lock cylinder assembly 56 is moved to the second position, holding the slider 64 in a retracted position and out of engagement with the retainer 68 such that the slider teeth 72 are disengaged from the retainer teeth 76. In this condition, the slider teeth 72 are prevented from engaging the retainer teeth 76, and the cover 36 is free to rotate relative to the inner threaded portion 40 without transmitting torque or rotational movement thereto. Therefore, when a vandal or miscreant attempts to unscrew the cap 20 in the locked configuration, the cover 36 spins, but no torque is transmitted to the retainer 68 or to the inner threaded portion 40, and the cap 20 cannot be unscrewed form the filling tube 32.

It should be understood that, in other constructions, the locking mechanism 24 may include different components and/or have components which operate in a different manner. For example, the cam portion 60 may move in a different manner (e.g., slide (laterally (side-to-side), vertically (up and down), etc.), pivot vertically, etc.) between the first and second positions. Also, the slider 64 may move in a different manner (e.g., pivot between the extended and retracted positions, rather than slide along an axis), slide along a different axis (e.g., up and down) between the extended and retracted positions.

In addition, different structure may be provided to rotatably connect the cover 36 and the inner threaded portion 40. For example, a friction engagement (rather than a toothed engagement) may be provided between the cover 36 and the inner threaded portion 40. In some constructions, the cap 20 includes a different type of toothed engagement, such as a ratchet assembly to prevent over-tightening of the cap 20 on the filling tube 32, prevent damage to the cap 20 and/or filling tube 32, provided audible and/or tactile feedback to the user that a sufficient level of torque (e.g., at or greater than a minimum retention torque) has been achieved, etc. The ratchet assembly includes an assembly for ratcheting engagement between the cover 36 and the inner threaded portion 40 when the cap 20 is in the unlocked condition. Regardless of whether or not ratcheting action is provided, the toothed engagement within the cap 20 has different orientations, numbers, and shapes of teeth 72, 76 is alternate embodiments.

Figure 2:
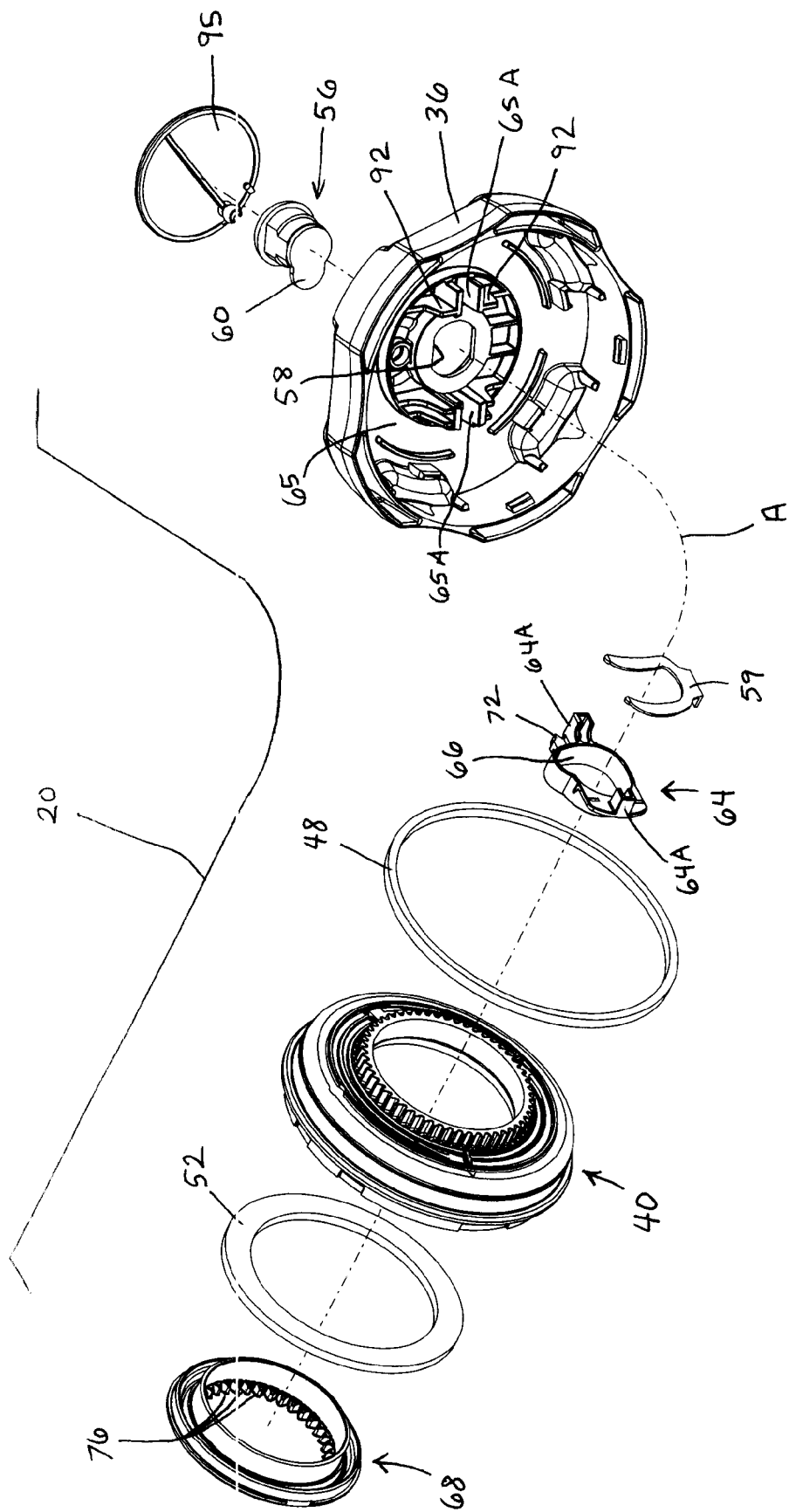
FIG. 2 is an exploded assembly view of the locking cap of FIG. 1.
Figure 3:
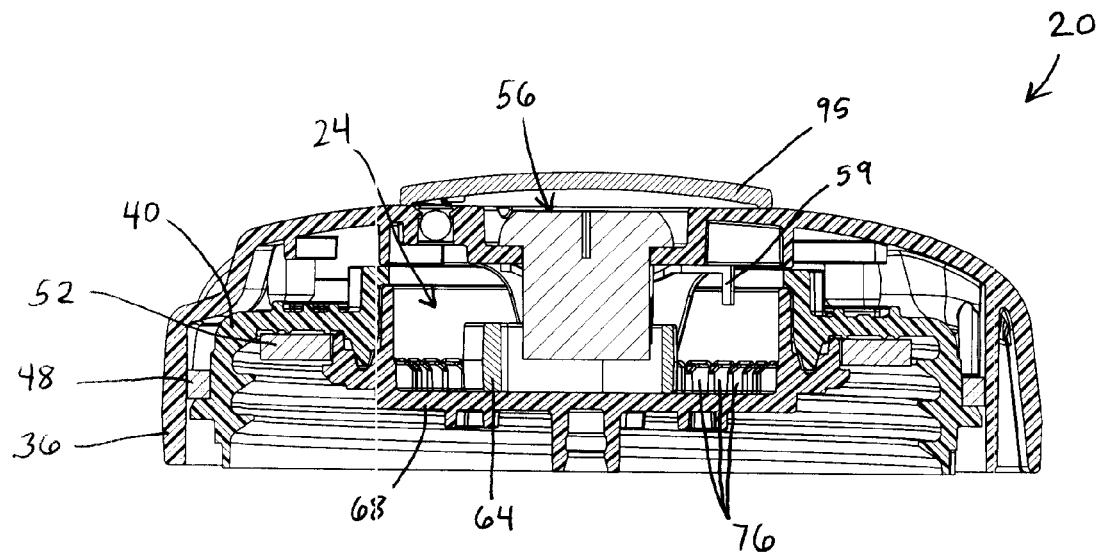
FIG. 3 is a cross-sectional view of the locking cap of FIG. 1, taken along line 3-3 of FIG. 1.
Figure 4:
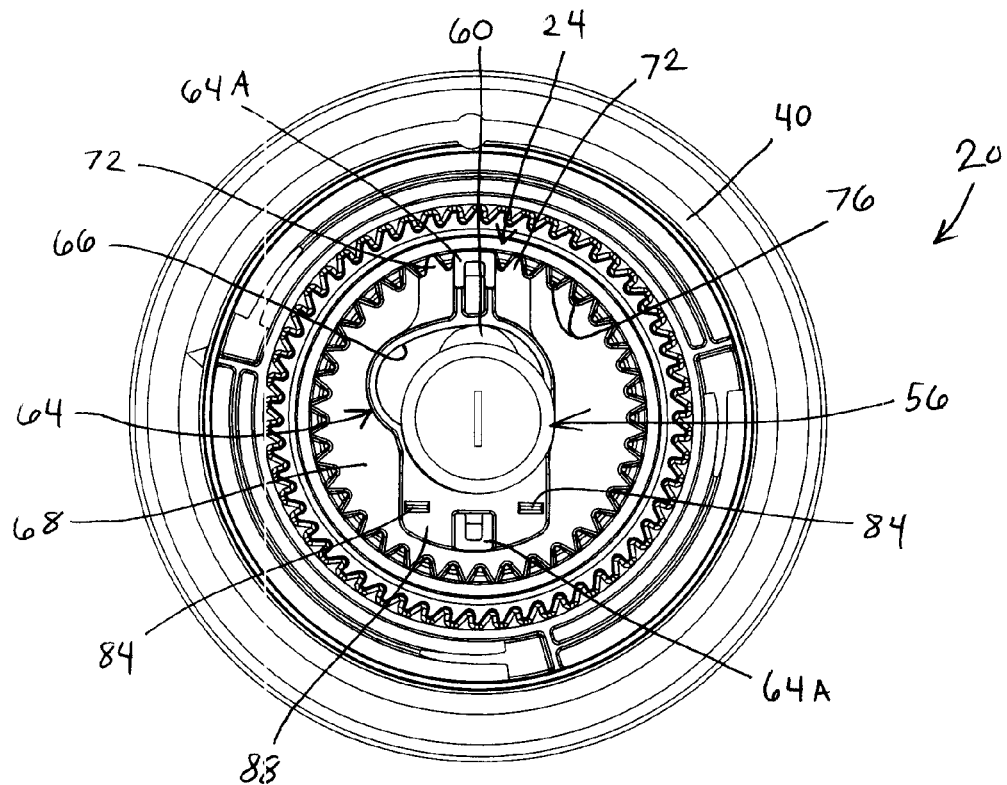
FIG. 4 is a top view of the locking cap of FIG. 1 shown in the unlocked state with the cover removed.
Figure 5:
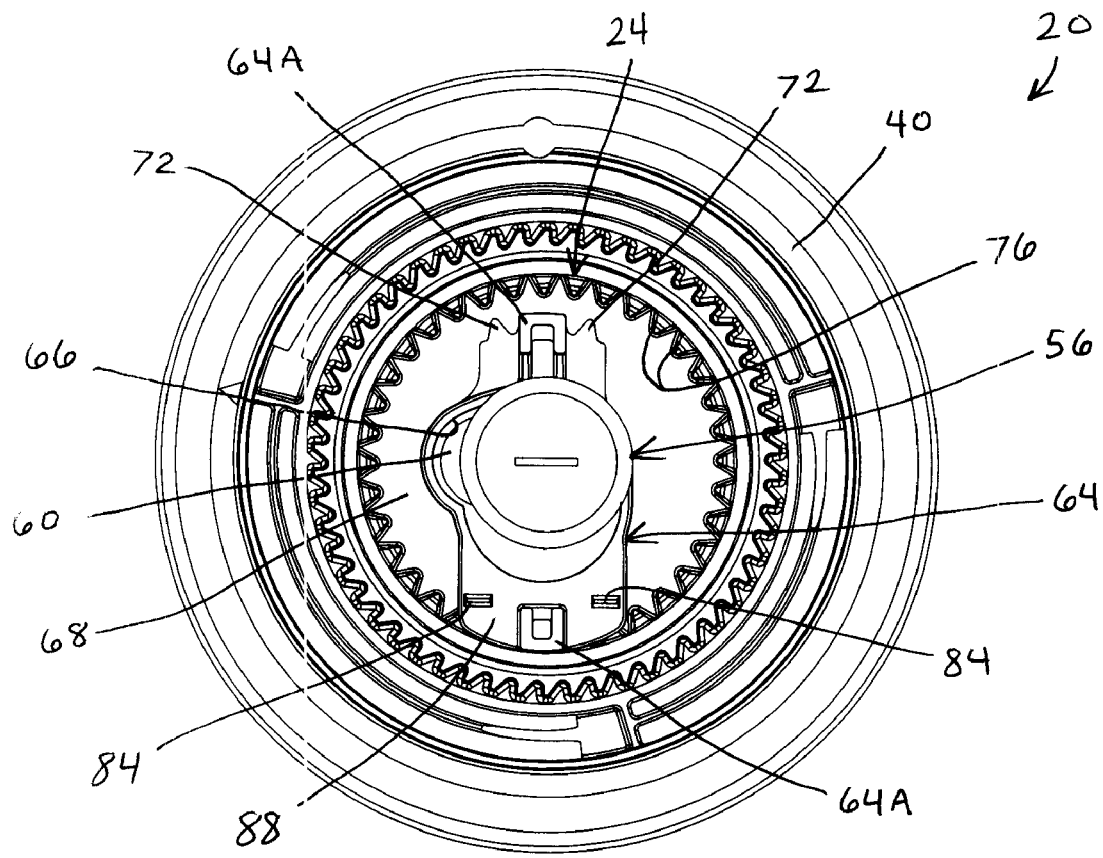
FIG. 5 is a top view of the locking cap of FIG. 1 shown in the locked state with the cover removed.
Figure 6:
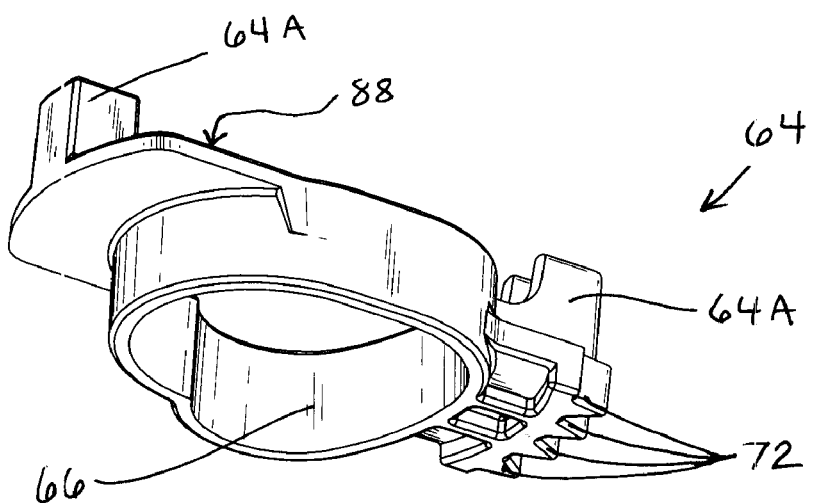
FIG. 6 is a perspective view of a slider of the locking cap of FIG. 1.

In some embodiments, as illustrated FIGS. 2, 4, and 5, the slider 64 includes two ribs 84 integrally formed with and projecting outwardly from a flat surface 88 of the slider 64. The ribs 84 extend from the flat surface 88 in the direction facing the cover 36. The ribs 84 are configured to snap over corresponding ribs 92 on the interior of the cover 36 when the slider 64 is moved from the locked position to the unlocked position and vice versa. This provides tactile and/or audible feedback to user when the locked/unlocked condition of the cap 20 is changed (i.e., when the slider 64 is moved from the retracted position to the extended position or vice versa). In some embodiments, the ribs 84 on the slider 64 and the corresponding ribs 92 on the cover 36 positively position the slider 64 in either the locked position or the unlocked position and act to prevent incidental movement of the slider 64 out of the desired position.

As illustrated in FIGS. 1-3 and 7, a dust cover 95 is rotatably mounted on the cover 36 in some embodiments to protect the locking mechanism 24 from harsh conditions and debris. The dust cover 95 includes visible indicia 98 in the illustrated embodiment to indicate the direction for rotating the dust cover from the closed position to the open position.

Figure 7:
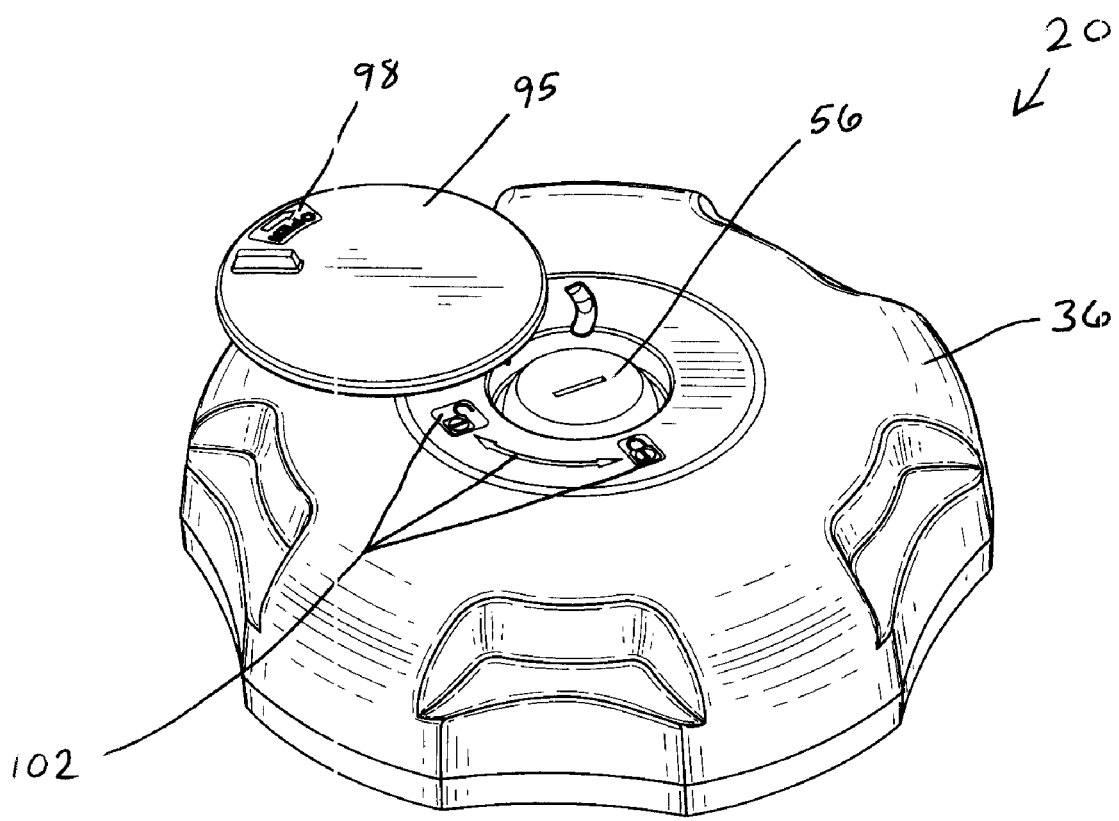
FIG. 7 is a perspective view of the locking cap of FIG. 1 with a dust cover opened.
Figure 8:
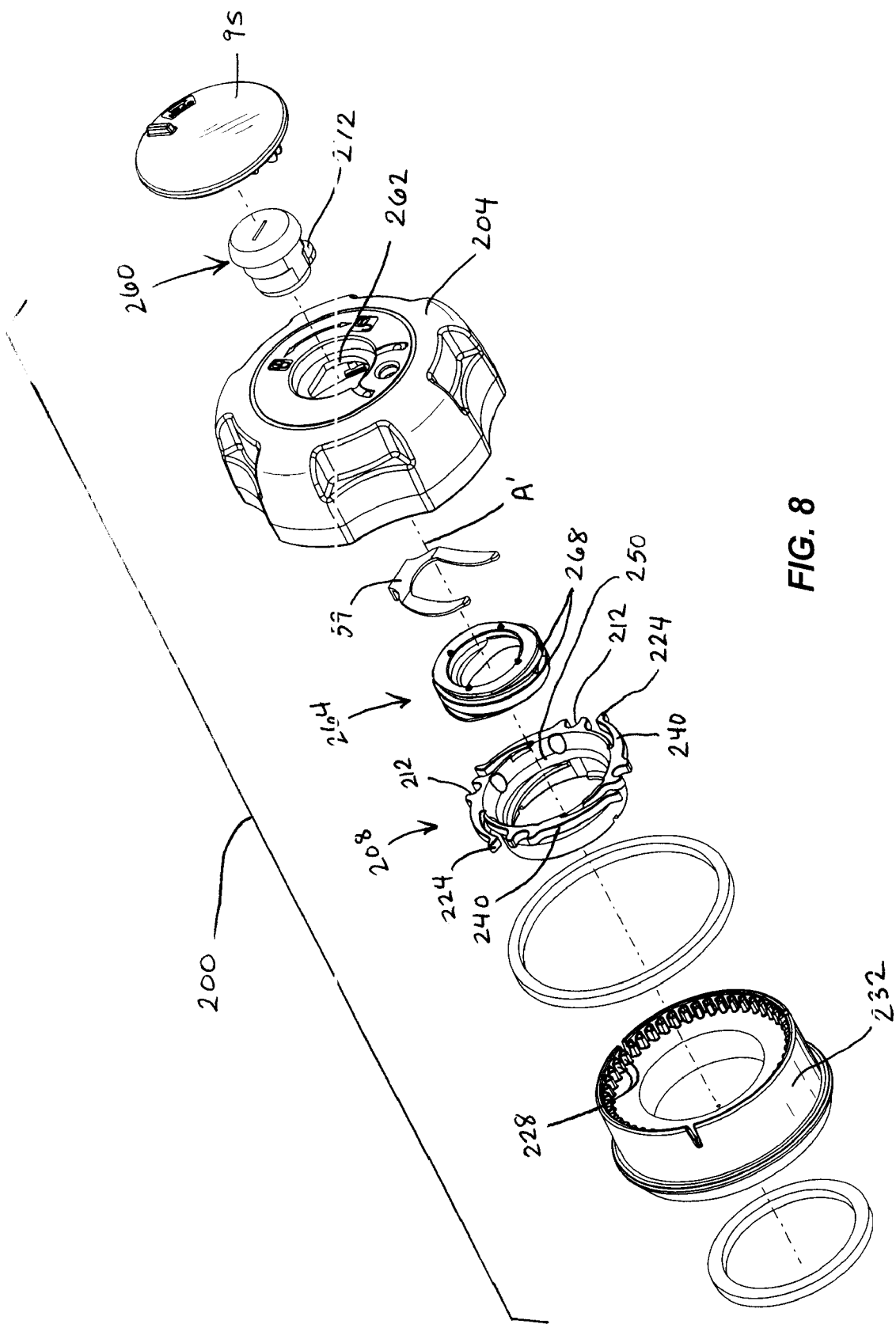
FIG. 8 is an exploded assembly view of a locking cap according to a second embodiment.
Figure 9:
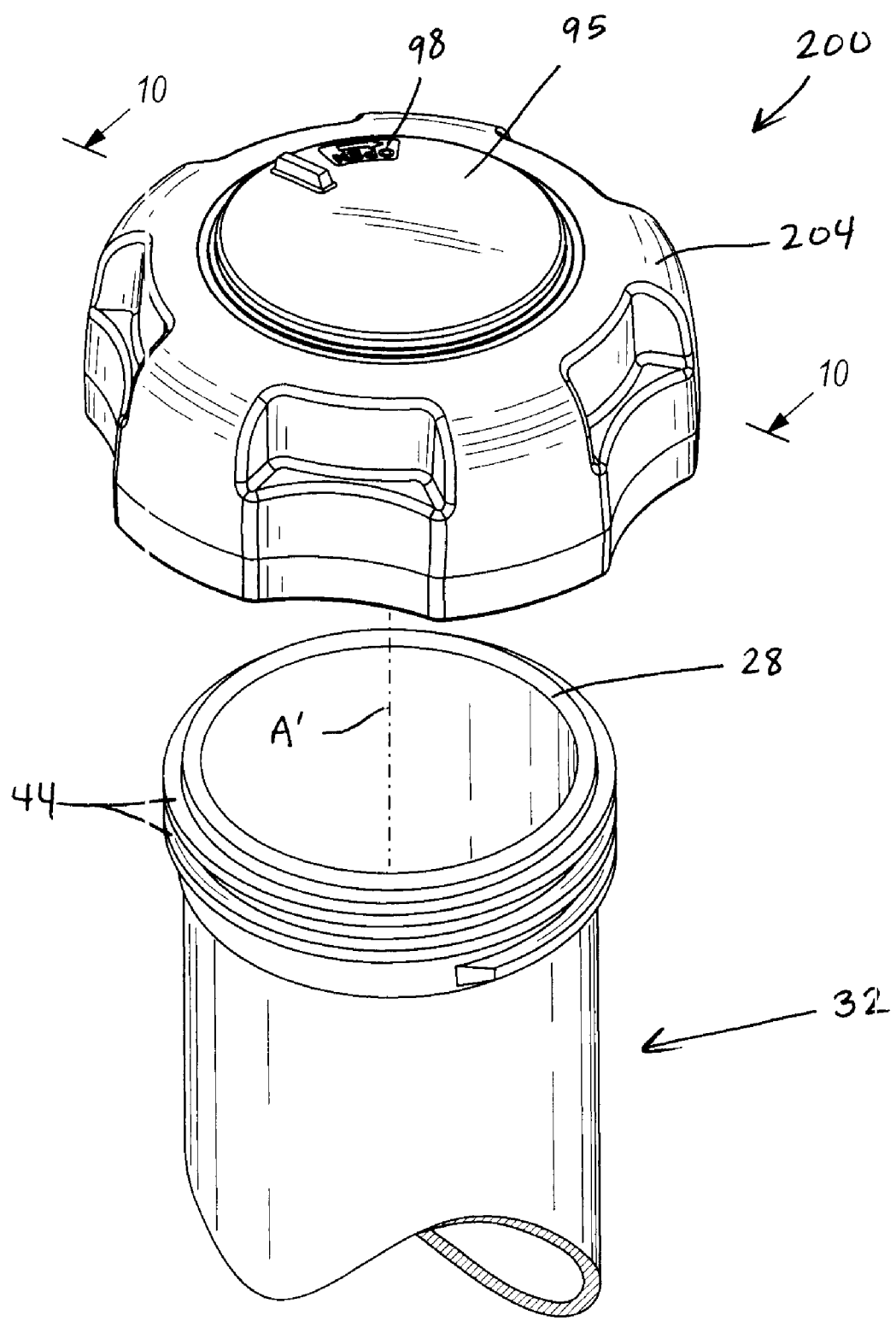
FIG. 9 is a perspective view of the locking cap of FIG. 8.
Figure 10:
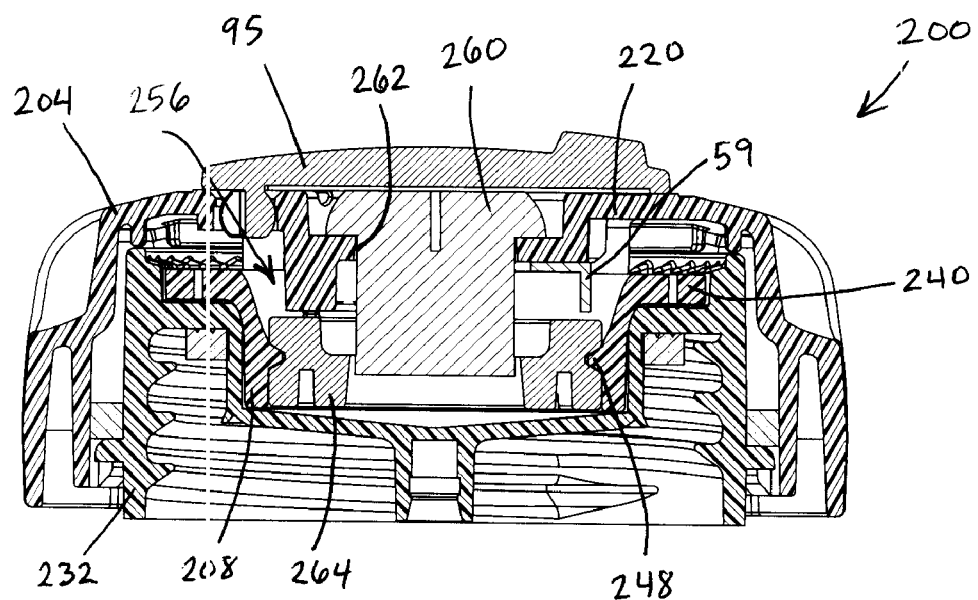
FIG. 10 is a cross-sectional view of the locking cap of FIG. 8, taken along line 10-10 of FIG. 9.
Figure 11:
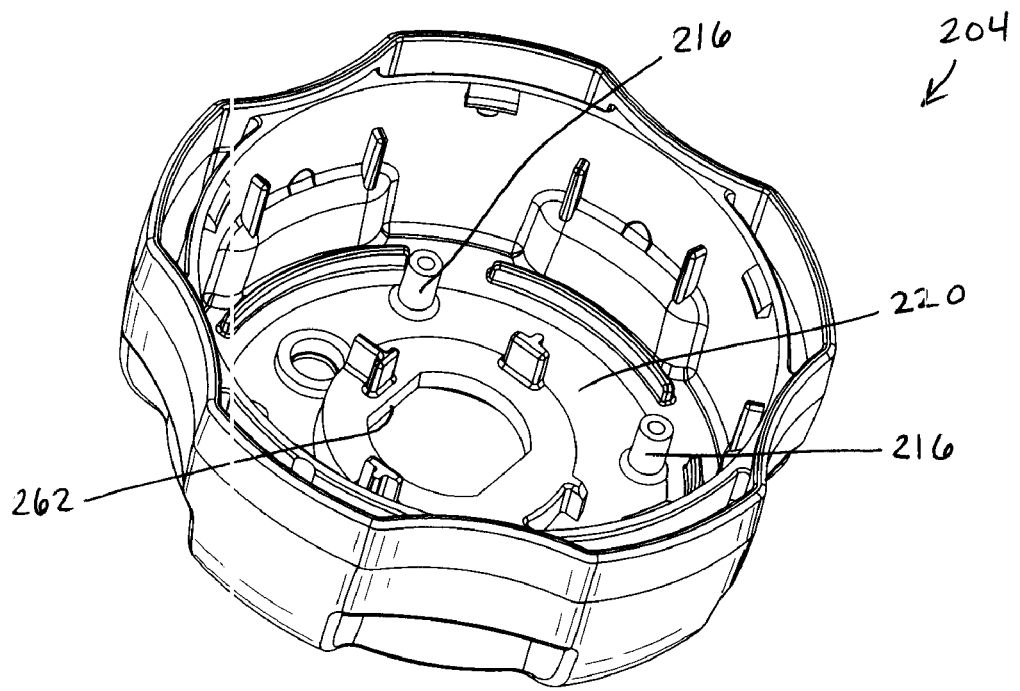
FIG. 11 is a perspective view of an outer cover portion of the locking cap of FIG. 8.
Figure 12:
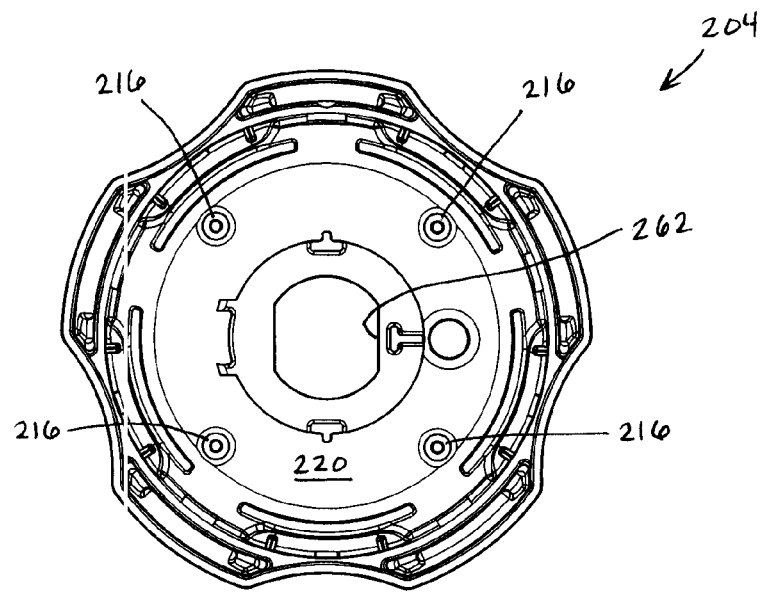
FIG. 12 is a bottom view of the outer portion of FIG. 11.
Figure 13:
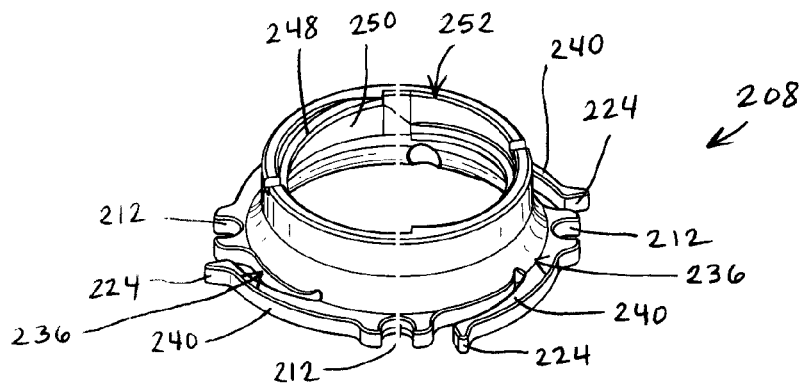
FIG. 13 is a perspective view of a slider of the locking cap of FIG. 8.
Figure 14:
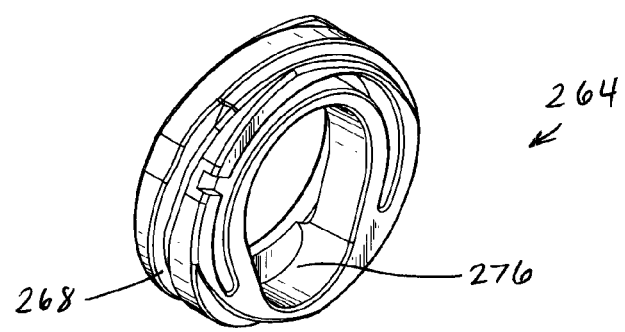
FIG. 14 is a perspective view of an actuator of the locking cap of FIG. 8.

In some embodiments, as best illustrated in FIG. 7, the cover 36 includes visible indicia 102 adjacent to the locking mechanism 24 to indicate the direction of key rotation to accomplish a locking operation and oppositely, an unlocking operation. In the illustrated embodiment, the indicia 102 include a "locked" padlock symbol, an "unlocked" padlock symbol, and corresponding curved arrows.

A cap 200 according to a second embodiment and individual portions thereof are illustrated in at least FIGS. 8-14. The cap 200 is rotatable about an axis A' and selectively engageable with the opening 28. The cap 200 includes some features common with the cap 20 illustrated in FIGS. 1-7, which features may be referred to by the same reference numerals. The elements and features which differ form the first embodiment are discussed in detail. The cap 200 includes an outer cover port on 204 (or simply, "cover") and a slider 208, which is coupled to the cover 204 for rotation therewith.

The slider 208 includes four notches 212, which engage respective posts 216 on an inner surface of a transverse wall 220 of the cover 204. The slider 208 also includes teeth 224 for engaging with complementary teeth 228 of an inner threaded portion 232 of the cap 200. The slider teeth 224 are spaced around an outer periphery of the slider 208. In the illustrated embodiments, the slider 208 is generally circular and formed with a flange portion 236. The notches 212 and the teeth 224 extend radially form the flange portion 236. In the illustrated embodiment, each tooth 224 is circumferentially spaced between an adjacent pair of notches 212 and vice versa. Each slider tooth 224 is formed at a distal end of a ratchet member 240.

The slider 208 includes threads 248 formed on an interior wall 250 of a central aperture 252. The cap 200 further includes a locking mechanism 256, which includes a lock cylinder assembly 260 and an actuator 264. The lock cylinder assembly 260, which may substantially identical to the lock cylinder 56 of FIGS. 2-5 and 7 in some embodiments, is received in an opening 262 in the cover 204. The actuator 264 is formed with threads 268 for engaging the threads 248 of the slider 208. The lock cylinder assembly 260 includes a cam portion 272 engageable with the actuator 264. In some embodiments, the cam portion 272 and the actuator 264 are in constant driving engagement with one another such that, when the lock cylinder assembly 260 is actuated by a key (not shown), the actuator 264 is rotated a substantially equal amount as the cam portion 272 about the axis A'. In the illustrated embodiment, the cam portion 272 is received in a pocket 276 of the actuator 264, and the cam portion 272 and actuator 264 rotate about the axis A' in a 1:1 ratio.

As the actuator 264 is rotated by the cam portion 272, it drives the slider 208 parallel to the axis A'. The slider 208 is fixed against rotation relative to the cover 204 via the notches 212 and posts 216. Thus, the rotation of the actuator 264 drives the slider 208 into and out of engagement with the teeth 228 of the inner threaded portion 232 along the axis A'.

When the slider teeth 224 are engaged with the teeth 228 of the inner threaded portion 232, the cap 200 is in an unlocked state and the cover 204 may be rotated in a counter clockwise direction about the axis A' to remove the cap 200 form the opening 28. A driving connection is established between the cover 204 and the inner threaded portion 232 in the cap-removal direction via the slider teeth 224 and the teeth 204 is rotated in a clockwise (cap-installing) direction on the opening 28, a torque-limited driving connection is established between the cover 204 and the inner threaded portion 232. When a torque is applied to the cover 204 in the cap-installing direction that exceeds a predetermined amount, the ratchet member 240 of the slider 208 deflect radially inwardly to allow the teeth 224 at the distal ends thereof to slip over the teeth 228 of the inner threaded member 232.

When the slider teeth 224 are disengaged from the teeth 228 of the inner threaded portion 232, the cap 200 is in the locked condition, and there is no driving connection in either direction between the cover 204 and the inner threaded portion 232. Therefore, the cap 200 is unable to be removed from the opening 28 by rotation about axis A' in the cap-removal direction.

Additional modifications to the caps disclosed include the option of mounting a tether for retaining the cap 20 or 200 to a fill tube or another member such as a vehicle frame or body. Tethers of various lengths and configurations are accommodated by the caps 20 and 200. The cap 20 or 200 can be vented or non-vented, provided with male or female threads, and provided with various sizes and types of threads.

What is claimed is:

1. A cap for selective attachment with a threaded opening, the cap comprising:
    an outer cover defining an axis and being manually rotatable about the axis, the outer cover further defining an interior space and providing guide portions;
    an inner portion lying at least partially within the interior space and including threads engageable with the threaded opening and a set of circumferentially-spaced teeth;
    a slider in constant driving engagement with the outer cover and being selectively engaged with the teeth of the inner portion to transmit torque from the outer cover to the inner portion, the slider having an axial opening with screw threads;
    an actuator having external screw threads engageable with the screw threads of the slider; and
    a lock accessible from outside the outer cover and being coupled to the actuator, wherein, in a locked state of the cap, the slider is axially removed from the teeth of the inner portion by the lock and actuator, and, in an unlocked state of the cap, the slider is engaged with the teeth of the inner portion;
    wherein axial movement of the slider is guided by sliding contact with the guide portions of the outer cover upon rotation of the lock and actuator.

2. The cap of claim 1, wherein the outer cover includes a transverse wall extending perpendicular to the axis, and the guide portions include posts that protrude from the transverse wall into the interior space.

3. The cap of claim 2, wherein the slider includes notches formed to receive the posts.

4. The cap of claim 3, wherein the notches are circumferentially-spaced about a flange portion of the slider and are each open on a radially outward side.

5. The cap of claim 3, wherein the slider is formed with ratchet members, which extend radially outwardly from the flange portion.

6. The cap of claim 1, wherein the slider is formed with ratchet members configured to drive the inner portion in a cap-removing direction without slippage and to drive the inner portion in a cap-installing direction with a torque-limited connection.

7. The cap of claim 1, further comprising a cam lobe on the lock, rotatable upon rotation of the key in the lock, and further comprising a pocket formed in the actuator for receiving the cam lobe and rotatably coupling the actuator thereto in a substantially 1:1 drive ratio.

8. The cap of claim 1, wherein the threads of the inner portion are formed on an interior sidewall of the inner portion.

9. A method of locking and unlocking a threaded cap having a manually-rotatable outer cover and a threaded portion that are selectively coupled to each other for torque transmission by a slider, the method comprising the acts of:
    providing at least one male/female coupling between the outer cover and the slider that allows sliding movement between the outer cover and the slider along a central axis of the cap and prevents any substantial relative rotation between the outer cover and the slider;
    providing an actuator coupled to a key-operated lock for direct rotation therewith and coupled to the slider with inter-engaging screw threads;
    rotating the lock and the actuator in a first direction to move the slider along the central axis and into engagement with the threaded portion and establish a driving connection between the outer cover and the threaded portion, thereby unlocking the cap; and rotating the lock and the actuator in a second direction opposite the first direction to move the slider along the axis and out of engagement with the threaded portion to sever the driving connection between the outer cover and the threaded portion, thereby locking the cap.

10. The method of claim 9, further comprising the act of maintaining the actuator in one predetermined position along the central axis during unlocking and/or locking of the cap.

11. The method of claim 9, wherein an act of unlocking the cap includes the act of meshing teeth of the slider with teeth of the threaded portion.

12. The method of claim 9, wherein an act of locking the cap includes the act of removing teeth of the slider from meshing engagement with teeth of the threaded portion.

13. The method of claim 9, further comprising the act of transforming rotational movement of the lock to linear movement of the slider via the inter-engaging screw threads.

14. An apparatus for changing the locked/unlocked state of a threaded cap by selectively coupling and decoupling an outer cover and a threaded member, the apparatus comprising:
   an outer cover;
   a threaded member;
   a lock having a locked state and an unlocked state;
   an actuator coupled to a portion of the lock for rotation therewith and being formed with a screw thread; and
   a slider formed with a screw thread for engaging the screw thread of the actuator, the slider being fixed against relative rotation with respect to the outer cover;
   wherein the slider is spaced from the threaded member when the lock is in the locked state, and the slider is engaged with the threaded member when the lock is in the unlocked state, the slider being movable in axial position and fixed in rotational orientation and transverse position with respect to the outer cover and threaded member; and
   wherein the actuator is axially and transversely stationary with respect to the outer cover and threaded member.

15. The apparatus of claim 14, wherein the slider includes a plurality of guideways engaging a plurality of protrusions on the outer cover.

16. The apparatus of claim 15, wherein the protrusions are integrally-formed posts extending axially from a transverse wall of the outer cover.

17. The apparatus of claim 14, wherein the actuator is formed with a pocket that receives a cam lobe of the lock for 1:1 rotation therewith.

18. The apparatus of claim 14, wherein the screw thread of the actuator is formed on an exterior surface thereof, and the screw thread of the slider is formed on an interior surface thereof.

19. The apparatus of claim 14, wherein the connection between the slider and the threaded member is torque-limited by ratchet members on the slider to prevent over-tightening.

20. A lockable fuel cap configured for threaded engagement with a fill tube or tank opening, the fuel cap comprising:
   an outer cover having a transverse wall and a plurality of posts extending from the transverse wall into an interior space of the outer cover;
   a slider having a plurality of open-ended notches around a periphery thereof for engagement with the plurality of posts and having a plurality of flexible ratchet members, each being formed with a ratchet tooth at a distal end thereof;
   a lock operable by a key having a locked condition and an unlocked condition, the lock including a cam lobe;
   a screw actuator coupled to the cam lobe to be rotatably driven by rotation of the lock, the screw actuator being further engaged with the slider via inter-engaging screw threads; and
   a threaded portion positioned substantially within the outer cover and having an inwardly-facing set of ratchet teeth;
   wherein the ratchet teeth are selectively engageable by the ratchet teeth of the slider to establish a driving connection between the outer cover and the threaded portion suitable to allow removal and/or installation of the fuel cap.

\* \* \* \* \*